US010852962B1

(12) United States Patent
Goodwill et al.

(10) Patent No.: US 10,852,962 B1
(45) Date of Patent: Dec. 1, 2020

(54) PARALLEL INPUT/OUTPUT (I/O) REPLICATING INCOMING DATA EMULATING FIBER CONNECTION (FICON) IN SHARED MEMORY

(71) Applicant: EMC IP Holding Company LLC, Hopkinton, MA (US)

(72) Inventors: Richard Goodwill, Shrewsbury, MA (US); Douglas E. LeCrone, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/520,727

(22) Filed: Jul. 24, 2019

(51) Int. Cl.
*G06F 3/06* (2006.01)
(52) U.S. Cl.
CPC ............ *G06F 3/0619* (2013.01); *G06F 3/065* (2013.01); *G06F 3/0655* (2013.01); *G06F 3/0689* (2013.01)
(58) Field of Classification Search
CPC ..... G06F 3/0619; G06F 3/0655; G06F 3/0689
See application file for complete search history.

(56) References Cited

U.S. PATENT DOCUMENTS

| | | | | |
|---|---|---|---|---|
| 8,554,955 | B2 * | 10/2013 | Craig | .................. G06F 3/0659 |
| | | | | 710/7 |
| 9,209,894 | B2 * | 12/2015 | Craig | ................. H04L 41/0663 |
| 10,375,214 | B2 * | 8/2019 | Ben-Amos | .......... H04L 67/1097 |
| 2019/0394138 | A1 * | 12/2019 | Raisch | .................... H04L 67/10 |
| 2020/0133561 | A1 * | 4/2020 | Yudenfriend | ......... G06F 3/0655 |

* cited by examiner

*Primary Examiner* — Tammara R Peyton
(74) *Attorney, Agent, or Firm* — Muirhead and Saturnelli, LLC (57) ABSTRACT

Replicating data written to a local storage device from a host includes receiving the incoming data using a first director that mirrors the incoming data from the first director to a second director independently of any links that transmit data to or from the directors and other components of the local storage device and transmitting the mirrored data from the local storage device to a remote storage device. The first director may be a target device (e.g., FICON target) that accepts data and connection requests from the host. The second director may be an initiator device (e.g., FICON initiator) that provides data and connection requests to the remote storage device. The second director may emulate a FICON initiator. The local storage device may wait for an acknowledgement of receipt of the data from the remote storage device before acknowledging receipt to the host.

14 Claims, 7 Drawing Sheets

PARALLEL INPUT/OUTPUT (I/O) REPLICATING INCOMING DATA EMULATING FIBER CONNECTION (FICON) IN SHARED MEMORY

TECHNICAL FIELD

This application relates to the field of computer systems and storage devices therefor and, more particularly, to the field of storage access and I/O operations among computing systems and transferring data between storage devices.

BACKGROUND OF THE INVENTION

Host processor systems may store and retrieve data using a storage device containing a plurality of host interface units (I/O modules), physical storage units (e.g., disk drives, solid state drives), and disk interface units (disk adapters). The host systems access the storage device through a plurality of channels provided therewith. Host systems provide data and access control information through the channels to the storage device and the storage device provides data to the host systems also through the channels. The host systems do not address the physical storage units of the storage device directly, but rather, access what appears to the host systems as a plurality of logical volumes. The logical volumes may or may not correspond to the physical storage units. Allowing multiple host systems to access the single storage device unit allows the host systems to share data stored therein.

In some cases, it is useful to protect data at a storage device by synchronously copying the data to another, remote, storage device. In connection with this, the host initiates a data write to a local storage device coupled to the host and the local storage device then transfers the data to the remote storage device. The local storage device does not acknowledge the write operation to the host until the remote storage device has acknowledged the write from the local storage device. Thus, the remote storage device contains all of the data contained on the local storage device. If the local storage device subsequently fails, all of the data is recoverable at the remote storage device.

A disadvantage to synchronously copying data from a local storage device to a remote storage device is the delay to write operations introduced where a write by the host is not acknowledged until the corresponding data transfer is acknowledged to the local storage device by the remote storage device. A significant part of the delay introduced is due to processing at the local storage device to first receive that data, convert the data to an internal format appropriate for the local storage device, and then reformat the data to a format appropriate for transferring the data to the remote storage device. Moreover, data received by the local storage device is moved to different components within the local storage device (e.g., global memory, RDF director, etc.) in connection with modifying the data format and transferring the data to the remote storage device. Moving the data and converting the data format adds a significant amount of the extra delay associated with synchronously copying data written by the host to a remote storage device.

Accordingly, it is desirable to provide a mechanism that allows synchronously copying data to a remote storage device following a host writing the data to a local storage device without introducing significant delays to the write operations.

SUMMARY OF THE INVENTION

According to the system described herein, replicating data written to a local storage device from a host includes receiving the incoming data using a first director that mirrors the incoming data from the first director to a second director independently of any links that transmit data to or from the directors and other components of the local storage device and transmitting the mirrored data from the local storage device to a remote storage device. The first director may be a target device that accepts data and connection requests from the host. The first director may be a FICON target. The second director may be an initiator device that provides data and connection requests to the remote storage device. The second director may be a FICON initiator. The second director may emulate the FICON initiator. The local storage device may acknowledge receipt of the data to the host. The local storage device may wait for an acknowledgement of receipt of the data from the remote storage device before acknowledging receipt to the host. The directors may be coupled together via a link that is independent of any common bus used to connect the directors to other components of the local storage device. The second director may provide the data to a plurality of remote storage devices.

According further to the system described herein, a non-transitory computer-readable medium has software that replicates data written to a local storage device from a host. The software includes executable code that receives the incoming data using a first director that that mirrors the incoming data from the first director to a second director independently of any links that transmit data to or from the directors and other components of the local storage device and executable code that transmits the mirrored data from the local storage device to a remote storage device. The first director may be a target device that accepts data and connection requests from the host. The first director may be a FICON target. The second director may be an initiator device that provides data and connection requests to the remote storage device. The second director may be a FICON initiator. The second director may emulate the FICON initiator. The local storage device may acknowledge receipt of the data to the host. The local storage device may wait for an acknowledgement of receipt of the data from the remote storage device before acknowledging receipt to the host. The directors may be coupled together via a link that is independent of any common bus used to connect the directors to other components of the local storage device. The second director may provide the data to a plurality of remote storage devices.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein provides a mechanism in which data that is written by a host to a local storage device is synchronously copied to a remote storage device without introducing significant delays. The local storage device has two directors (or more) that receive writes from a host essentially in parallel where one of the directors handles the received data locally in a conventional manner while the other one of the directors transfers the data to a remote storage device using RDF protocol or by simulating a host connection (FICON initiator emulation).

Figure 1:
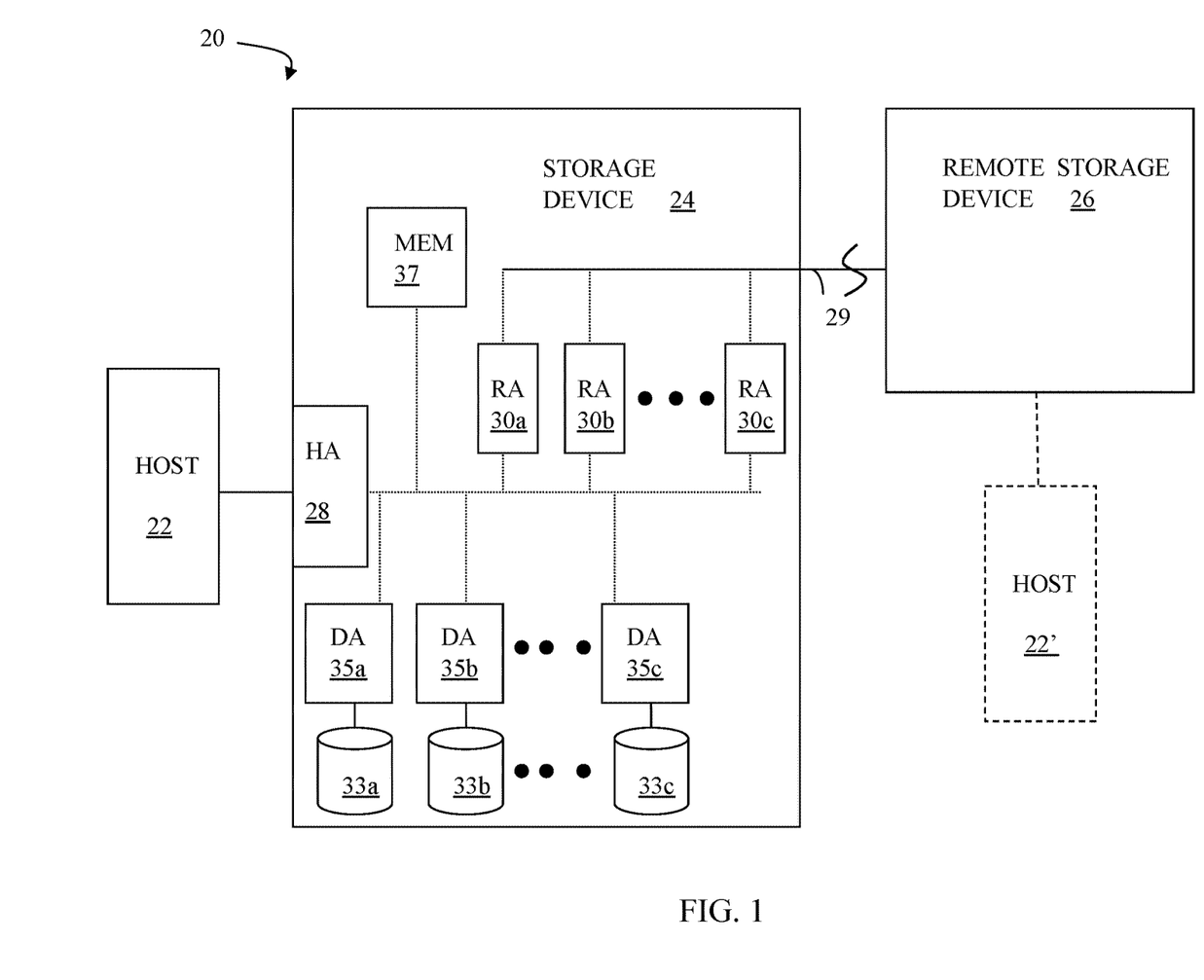
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more physical storage units (including disks, solid state storage devices, etc.), each containing a different portion of data stored on the storage device 24. FIG. 1 shows the storage device 24 having a plurality of physical storage units 33a-33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown in FIG. 1). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path (e.g., a common bus) exists between the DA's 35a-35c, the HA 28 and the RA's 30a-30c of the storage device 24. Note that, in other embodiments, it is possible for more than one physical storage unit to be serviced by a DA and that it is possible for more than one DA to service a physical storage unit. The storage device 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage device 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage device 26 may be subdivided into a plurality of volumes or logical devices, where each of the logical devices may or may not correspond to one or more physical storage units of the remote storage device 26.

In some embodiments, an other host 22' may be provided. The other host 22' is coupled to the remote storage device 26 and may be used for disaster recovery so that, upon failure at a site containing the host 22 and the storage device 24, operation may resume at a remote site containing the remote storage device 26 and the other host 22'. In some cases, the host 22 may be directly coupled to the remote storage device 26, thus protecting from failure of the storage device 24 without necessarily protecting from failure of the host 22.

Figure 2:
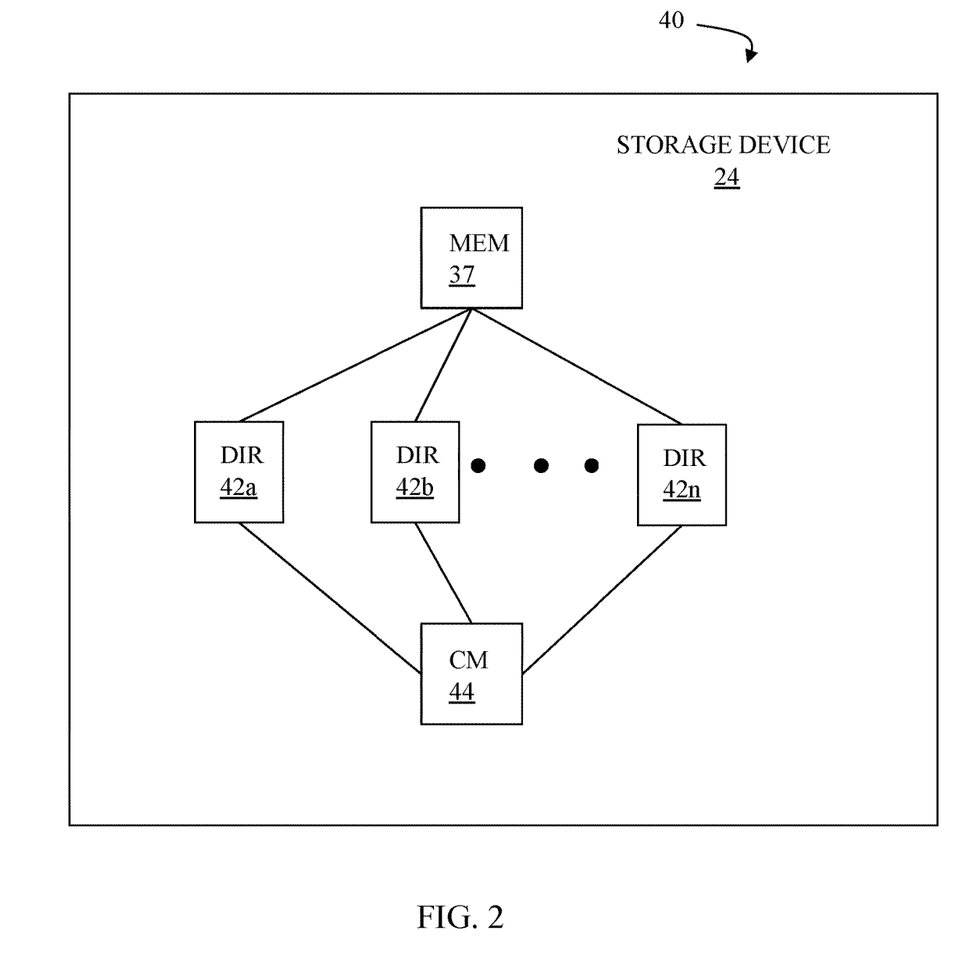
FIG. 2 is a schematic diagram illustrating an embodiment of a storage device where each of a plurality of directors are coupled to a memory according to an embodiment of the system described herein.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
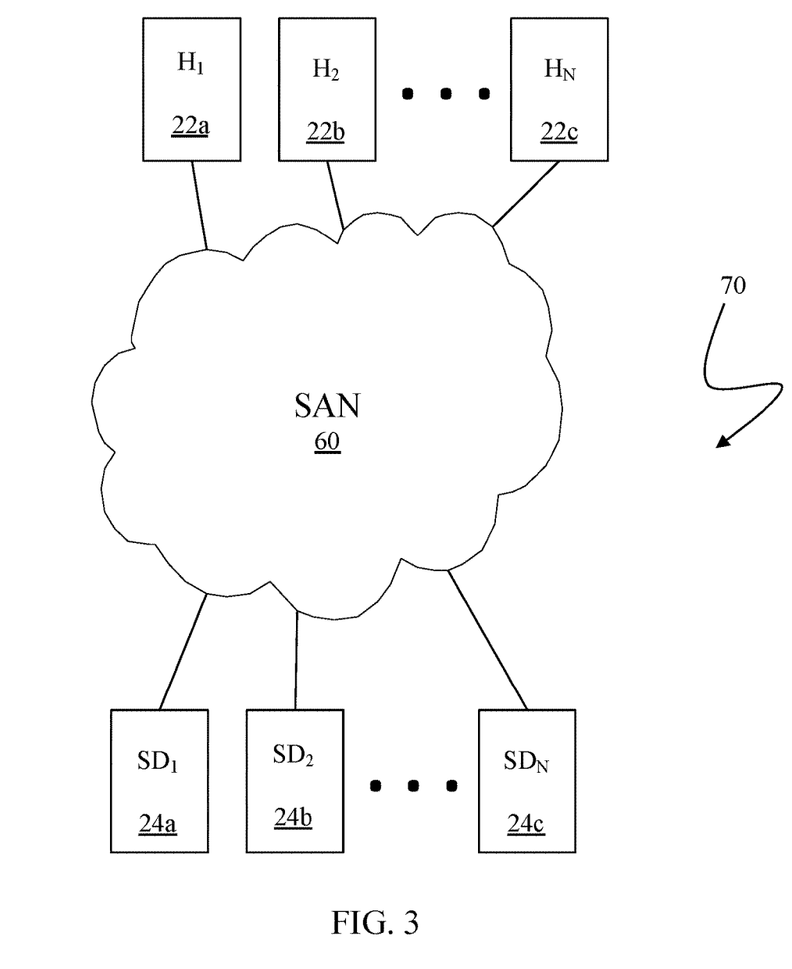
FIG. 3 is a schematic illustration showing a storage area network (SAN) providing a SAN fabric coupling a plurality of host devices to a plurality of storage devices that may be used in connection with an embodiment of the system described herein.

FIG. 3 is a schematic illustration 70 showing a storage area network (SAN) 60 providing a SAN fabric coupling a plurality of host devices ($H_1$-$H_N$) 22a-c to a plurality of storage devices ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from Dell EMC.

Figure 4:
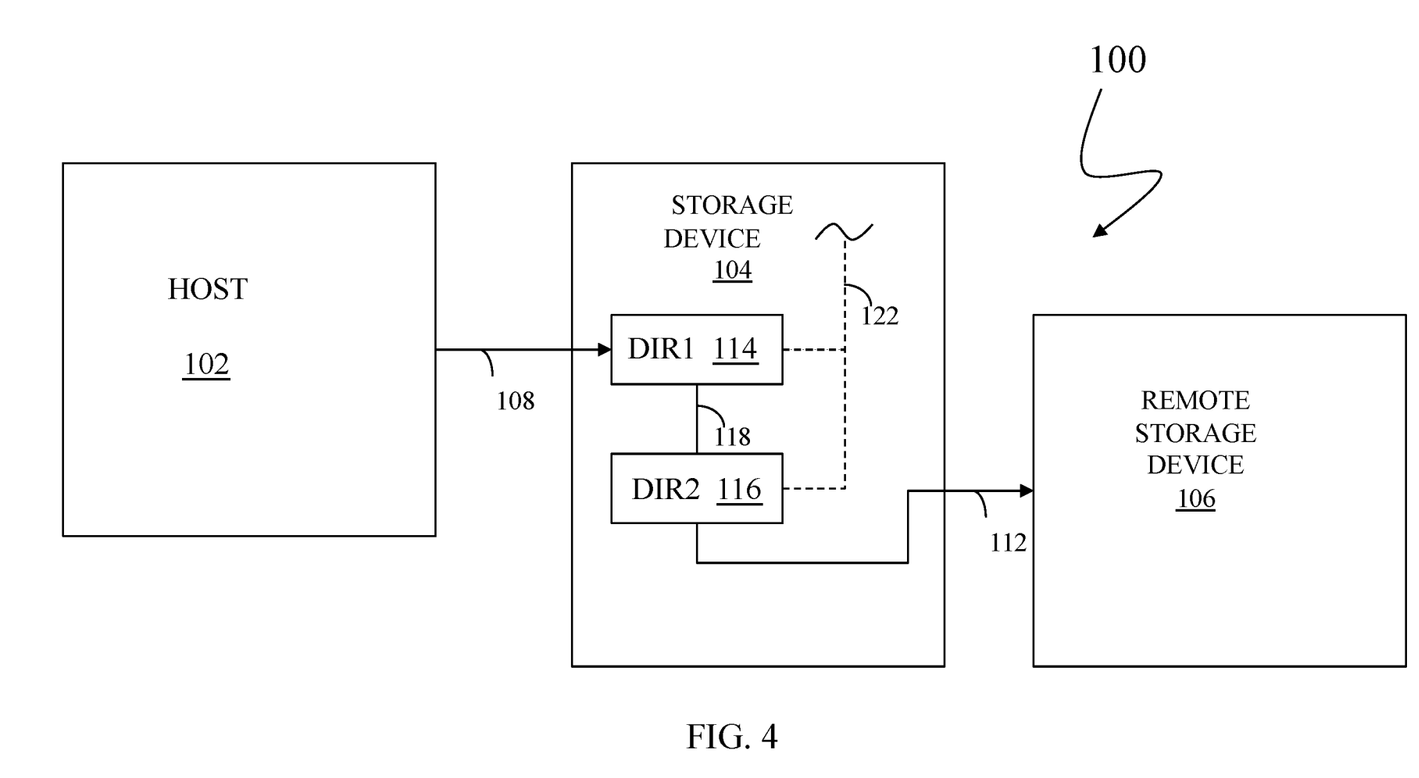
FIG. 4 is a schematic illustration showing a host, a local storage device, and a remote storage device according to an embodiment of the system described herein.

Referring to FIG. 4, a diagram illustrates a system 100 that includes a host 102 coupled to a local storage device 104 which is coupled to a remote storage device 106. The host 102 is similar to the host 22 discussed above in connection with FIG. 1 while the local storage device 104 is similar to the local storage device 24, discussed above, and the remote storage device 106 is similar to the remote storage device 26, discussed above. The host 102 writes data to the local storage device 104 via a first link 108 which copies the data to the remote storage device 106 via a second link 112. In an embodiment herein, the links 108, 112 may be FICON links, although any appropriate type of links may be used. For example, one or more of the links 108, 112 may include FICON simulation capabilities along with at least a portion that may be incompatible with a FICON connection. This is described in more detail elsewhere herein. The local storage device 104 acknowledges the write operation by the host 102 after the remote storage device 106 acknowledges receiving the data from the local storage device 104. Thus, the remote storage device 106 maintains a synchronous copy of data that is written by the host 102 to the local storage device 104.

The local storage device 104 includes a first director 114 and a second director 116 that are similar to the directors 42a-42n discussed above in connection with FIG. 2. The first director 114 is coupled to the host 102 and provides functionality similar to that provided by the HA 28, discussed above. In an embodiment herein, the first director 114 acts as a FICON target, although generally it is sufficient to have the first director 114 acts as any sort of target device that can accept data and possibly also accept connection requests from the host 102. The second director 116 is coupled to the remote storage device 106 and provides functionality similar to the RA's 30a-30c, discussed above. In other embodiments, the second director 116 may simulate host functionality so that the local storage device 104 provides host commands to the remote storage device 106 and the remote storage device 106 provides host responses to the local storage device 106. Host commands are commands designed to be sent from a host to a storage device. Host responses are responses designed to be sent from a storage device to a host.

This is explained in more detail elsewhere herein. In an embodiment herein, the second director 116 acts as a FICON initiator, although generally it is sufficient to have the second director 116 acts as any sort of initiator device that can transmit data and possibly provide connection requests to the remote storage device 106.

The directors 114, 116 are coupled to an internal data path (common bus) 122, described above, to facilitate exchanging data between the directors 114, 116 and other components of the local storage device 104, such as the memory (not shown in FIG. 4), the DAs (not shown in FIG. 4), etc. In addition, the directors 114, 116 may be directly coupled to each other via a link 118 that facilitates directly exchanging data, commands, and status information between the directors 114, 116 independently of any internal data path (common bus) 122 used by the local storage device 104 to connect the directors 114, 116 to other internal components (not shown) of the local storage device 104. That is, data, commands, and status information may be exchanged between the directors 114, 116 without needing to have any of the data, status, or commands be placed on or otherwise use the internal data path (common bus) 122.

In an embodiment herein, the directors 114, 116 include hardware that causes data received by the local storage device 104 from the host 102 to be received nearly at the same time at the second director 116. The data received at the second director 116 from the first director 114 is identical to and in the same format as the data received by the first director 114 from the host 102. This may be accomplished using, for example, protocol chips (PCIe switch components) that are designed/programmed to mirror incoming data so that data received by the first director 114 is placed in internal buffers and transmitted by the internal path (common bus) 122 of the local storage device 104 in a conventional manner and is also mirrored directly via the link 118 to the second director 116 without any modifications to the received data or the format thereof.

Figure 5:
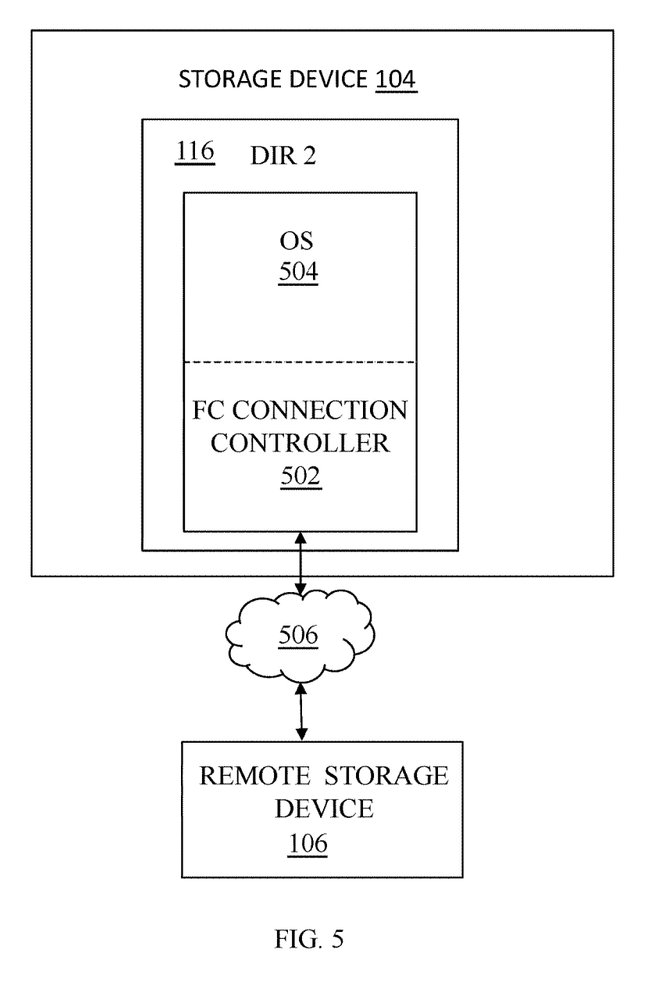
FIG. 5 is a schematic illustration showing a system with a FICON connection between a local storage device and a remote storage device according to an embodiment of the system described herein.

Referring to FIG. 5, a schematic illustration shows the second director 116 with a FICON connection controller 502 for providing FICON connectivity between the local storage device 104 and the remote storage device 106 according to an embodiment of the system described herein. The second director 116 may include a processor running Linux or some other appropriate operating system 504 that provides the functionality described herein. The FICON connection controller 502 enables I/O operations with the remote storage device 106. In an embodiment herein, the FICON connection controller 502 simulates a host so that the remote storage device 106 interacts with the local storage device 104 as if the local storage device 104 were a host. That is, the local storage device 104 appears to the remote storage device 106 as a host coupled directly to the remote storage device 106. The FICON connection controller 502 may send and receive data to and from the remote storage device 106 using a remote connection mechanism 506 that may include a network (such as the Internet, and appropriate connection thereof). For a discussion of features and implementations of FICON systems and suitable channel protocols operating therewith on z/Architecture computing systems, reference is made to J. Entwistle, "IBM System z10 FICON Express8 FCP Channel Performance Report," Technical paper, Aug. 2009, 27 pp., which is incorporated herein by reference.

It is noted that various components of the system may be emulated. For further discussion of emulation of I/O computing components, particular Fibre Channel/FICON connection components, reference is made to U.S. Pat. No. 9,665,502 to Jones et al., issued May 30, 2017, entitled "Virtual I/O Hardware" and to U.S. Pat. No. 9,170,904 to LeCrone et al., issued Oct. 27, 2015, entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 506 may include an Internet connection and/or possibly some other types of connection(s). In an embodiment herein, the connection mechanism 506 may be directly incompatible with a FICON connection. The incompatibility may be hardware incompatibility, software incompatibility, or both. Such connection mechanism 506 may not support a direct FICON connection but, instead, rely on a FICON emulator (and/or other emulator(s)) for providing data in an appropriate format. It is further noted that where FICON emulation is being performed, the remote storage device 106 may include or be coupled to a FICON emulator portion that may send and receive data to and from the connection mechanism 506 and also emulates a Fibre Channel FCO physical layer for the benefit of the remote storage device 106. Thus, in such a case involving emulation, both the local storage device 104 and the remote storage device 106 may operate as if the devices 104, 106 were communicating using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol. zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

Figure 6:
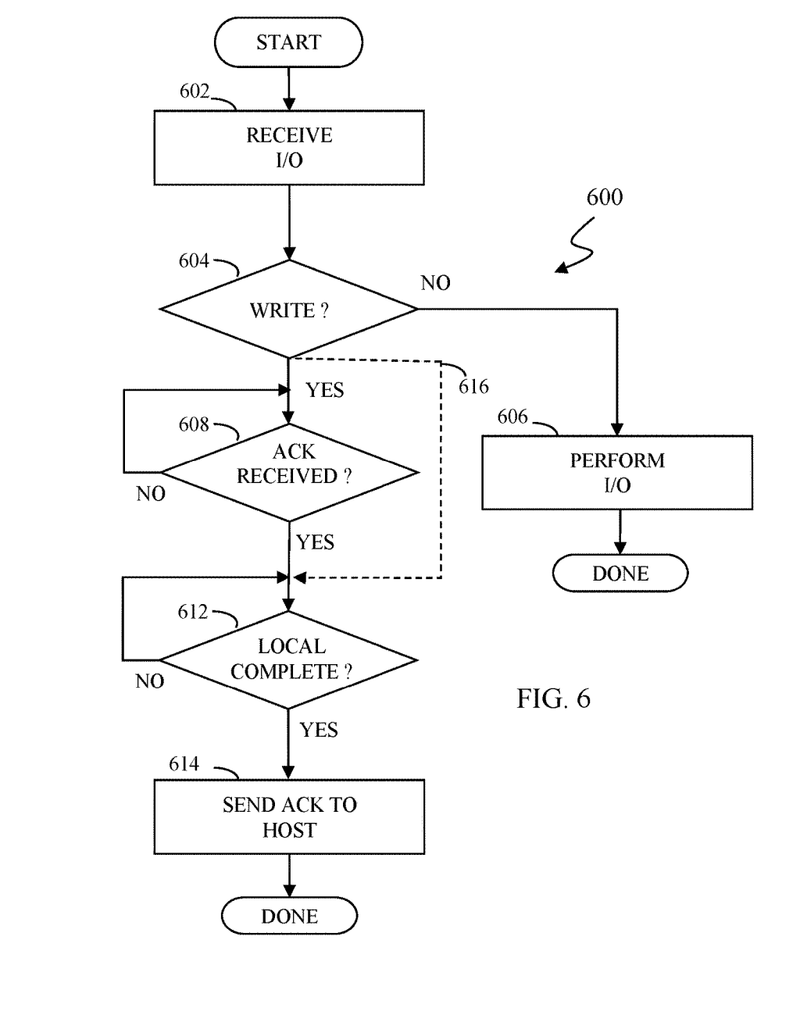
FIG. 6 is a flow diagram illustrating processing performed by a director of a local storage device coupled to a host according to an embodiment of the system described herein.

Referring to FIG. 6, a flow diagram 600 illustrates processing performed at the first director 114 in connection with performing I/O operations with the host 102. Processing begins at a first step 602 where the first director 114 receives an I/O operation from the host 102. Following the step 602 is a test step 604 where it is determined if the I/O operation is a write operation. If not, then control transfers from the test step 604 to a step 606 where the I/O operation is serviced in a conventional fashion. For example, if the I/O operation is a read operation, the first director 114 services the read operation by fetching data from cache memory and/or a disk drive of the local storage device 104. In some embodiments, if data is being read by the host 102 and the requested data is not in the cache memory of the local storage device 104, the data may be requested from the remote storage device by the local storage device 104 and then copied into the cache memory of the local storage device. Following the step 606, processing is complete.

If it is determined at the test step 604 that the I/O operation from the host 102 is a write operation, then control transfers from the test step 604 to a test step 608 where the first director 114 waits for an acknowledgement from the second director 116 that data has been successfully transferred from the second director 116 to the remote storage device 106. As discussed elsewhere herein, when data is written by the host 102, it is received in parallel by both the first director 114 and the second director 116 and the second director 116 immediately transfers the data to the remote storage device 116 using RDF or by simulating a host connection to the remote storage device 116. The test at the step 608 waits for the remote storage device 106 to acknowledge receipt of the data from the second director 116. Once the acknowledgement is received, control transfers from the test step 608 to test step 612 where it is determined if local processing of the data write is complete. The local processing may include copying the data to local memory of the local storage device 104, modifying metadata to reflect the new data, etc. The test at the step 612 waits for the local storage device 104 to complete processing associated with receipt of the data from the host 102. In an embodiment herein, the local storage device 104 commits the data write to the local storage device 104 as part of completing processing associated with receipt of the data from the host 102. Once local processing of the data is complete, control transfers from the step 612 to a step 614 where the first director 114 acknowledges to the host 102 receipt of data from the host 102. Following the step 614, processing is complete.

In an alternative embodiment, it is possible to forego determining if the remote storage device 106 has received the data prior to acknowledging receipt back to the host 102. This is illustrated by an alternative path 616 that skips the test at the step 608, discussed above. In such a case, data is being transferred to the remote storage device 106 asynchronously and acknowledgement back to the host 102 is independent of whether the remote storage device 106 has received the data.

Figure 7:
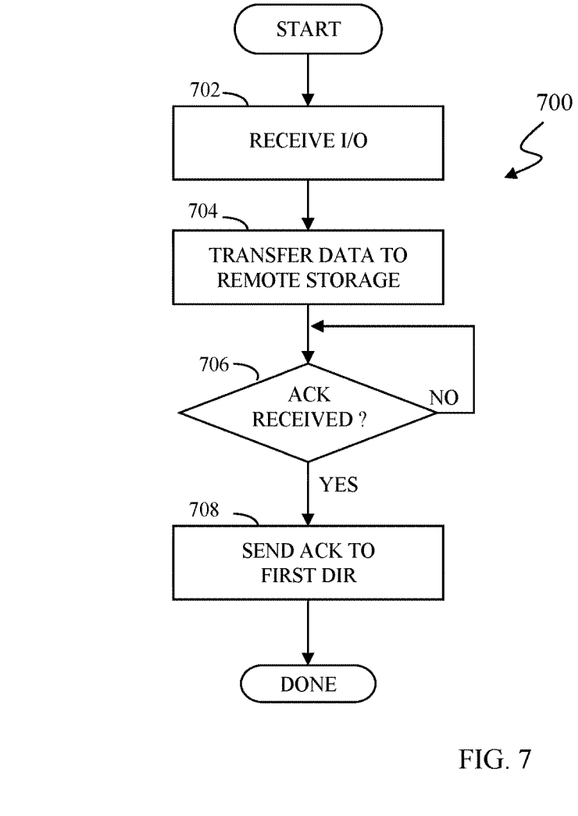
FIG. 7 is a flow diagram illustrating processing performed by a director of a local storage device coupled to a remote storage device according to an embodiment of the system described herein.

Referring to FIG. 7, a flow diagram 700 illustrates processing performed by the second director 116 in connection with transferring data to the remote storage device 106. Processing begins at a first step 702 where the second director 116 receives data from the first director 114. As discussed elsewhere herein, when the host 102 writes data to the local storage device 104, the data is received in parallel or nearly in parallel by both of the directors 114, 116. Following the step 702 is a step 704 where the second director 116 transfers the data to the remote storage device 106 using, for example, RDF or host transfer protocols, as discussed elsewhere herein. Following the step 704 is a test step 706 where the second director 116 waits for an acknowledgement from the remote storage device 106 that data has been successfully transferred from the remote storage device 106. The test at the step 706 waits for the remote storage device 106 to acknowledge receipt of the data from the second director 116. In an embodiment herein, the remote storage device 106 acknowledging receipt signifies that the remote storage device has committed the data write to the remote storage device 106. Once the acknowledgement is received, control transfers from the test step 706 to a step 708 where the second director 116 acknowledges receipt of the data by the remote storage device 106 to the first director 114. Following the step 708, processing is complete.

Figure 8:
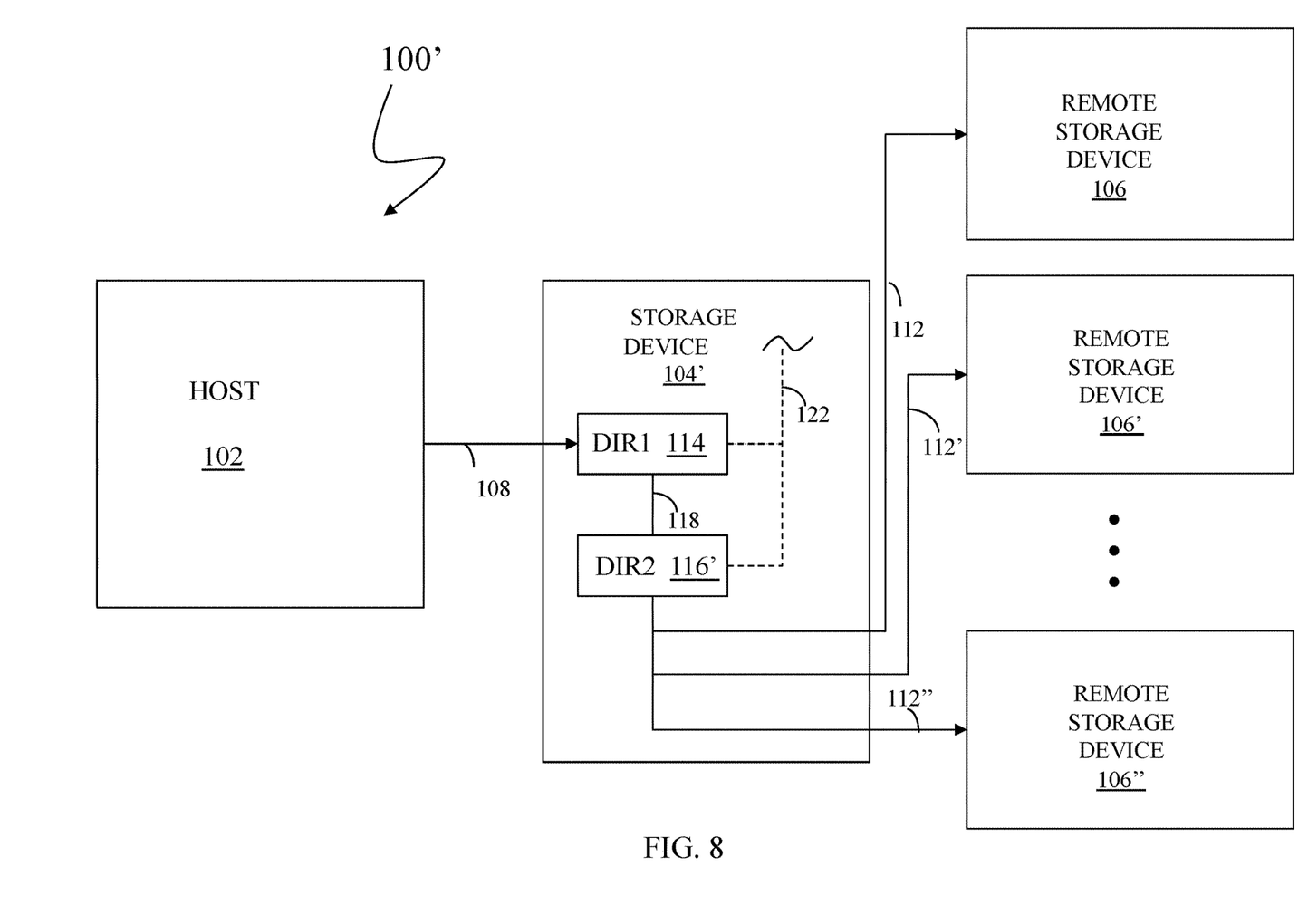
FIG. 8 is a schematic illustration showing a host, a local storage device, and a plurality of remote storage devices according to an embodiment of the system described herein.

Referring to FIG. 8, an alternative embodiment 100' uses an alternative second director 116' that is coupled to additional remote storage devices 106', 106" via links 112', 112" in a manner similar to the second director 116 being coupled to the remote storage device 106 via the link 112, discussed elsewhere herein. The alternative second director 116' may have any number of remote storage devices coupled thereto. Note that it is also possible to mirror data received by the first director to any number of additional directors internal to the local storage device, each of which may then transmit the mirrored data to one or more remote storage devices.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of replicating data written to a local storage device from a host, comprising:
receiving the incoming data using a first director that mirrors the incoming data from the first director to a second director independently of any links that transmit data to or from the directors and other components of the local storage device, wherein the second director emulates a FICON initiator that provides data and connection requests to the remote storage device; and
transmitting the mirrored data from the local storage device to a remote storage device.

2. A method, according to claim 1, wherein the first director is a target device that accepts data and connection requests from the host.

3. A method, according to claim 2, wherein the first director is a FICON target.

4. A method, according to claim 1, wherein the local storage device acknowledges receipt of the data to the host.

5. A method, according to claim 4, wherein the local storage device waits for an acknowledgement of receipt of the data from the remote storage device before acknowledging receipt to the host.

6. A method, according to claim 1, wherein the directors are coupled together via a link that is independent of any common bus used to connect the directors to other components of the local storage device.

7. A method, according to claim 1, wherein the second director provides the data to a plurality of remote storage devices.

8. A non-transitory computer-readable medium having software that replicates data written to a local storage device from a host, the software comprising:
    executable code that receives the incoming data using a first director that that mirrors the incoming data from the first director to a second director independently of any links that transmit data to or from the directors and other components of the local storage device, wherein the second director emulates a FICON initiator that provides data and connection requests to the remote storage device; and
    executable code that transmits the mirrored data from the local storage device to a remote storage device.

9. A non-transitory computer-readable medium, according to claim 8, wherein the first director is a target device that accepts data and connection requests from the host.

10. A non-transitory computer-readable medium, according to claim 9, wherein the first director is a FICON target.

11. A non-transitory computer-readable medium, according to claim 8, wherein the local storage device acknowledges receipt of the data to the host.

12. A non-transitory computer-readable medium, according to claim 11, wherein the local storage device waits for an acknowledgement of receipt of the data from the remote storage device before acknowledging receipt to the host.

13. A non-transitory computer-readable medium, according to claim 8, wherein the directors are coupled together via a link that is independent of any common bus used to connect the directors to other components of the local storage device.

14. A non-transitory computer-readable medium, according to claim 8, wherein the second director provides the data to a plurality of remote storage devices.

* * * * *